US011971721B2

(12) United States Patent
Takai et al.

(10) Patent No.: US 11,971,721 B2
(45) Date of Patent: Apr. 30, 2024

(54) AUTONOMOUS MOBILE ROBOT CONTROL SYSTEM, CONTROL METHOD THEREOF, A NON-TRANSITORY COMPUTER READABLE MEDIUM STORING CONTROL PROGRAM THEREOF, AND AUTONOMOUS MOBILE ROBOT CONTROL DEVICE

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Tetsuya Taira, Nagakute (JP); Mikio Honda, Toyota (JP); Shiro Oda, Anjo (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 17/392,541

(22) Filed: Aug. 3, 2021

(65) Prior Publication Data
US 2022/0066454 A1 Mar. 3, 2022

(30) Foreign Application Priority Data

Aug. 26, 2020 (JP) .................................. 2020-142719

(51) Int. Cl.
*G05D 1/00* (2006.01)
*B60W 60/00* (2020.01)

(52) U.S. Cl.
CPC ....... *G05D 1/0214* (2013.01); *B60W 60/0011* (2020.02); *G05D 1/0088* (2013.01); *G05D 1/0251* (2013.01)

(58) Field of Classification Search
CPC .. G05D 1/0214; G05D 1/0088; G05D 1/0251; G05D 1/0282; G05D 1/0253;
(Continued)

(56) References Cited

U.S. PATENT DOCUMENTS 9,026,301 B2 5/2015 Zini et al.
2017/0241790 A1 8/2017 Yoshikawa
(Continued)

FOREIGN PATENT DOCUMENTS

CN 110609540 A 12/2019
JP H03-48400 A 3/1991
(Continued)

*Primary Examiner* — Aaron L Troost
(74) *Attorney, Agent, or Firm* — Oliff PLC

(57) ABSTRACT

To effectively enhance the operation efficiency of an autonomous mobile robot, an autonomous mobile robot control system includes a processor and a plurality of environmental cameras. The processor estimates a moving route of each of a plurality of moving bodies on the basis of characteristics of each of the plurality of moving bodies and sets a subset of the plurality of moving bodies whose moving routes overlap among the detected moving bodies as avoidance processing target moving bodies. The processor generates an avoidance procedure for the avoidance processing target moving bodies so the motion of the avoidance processing target moving bodies does not interfere with the motion of other avoidance target moving bodies.

9 Claims, 7 Drawing Sheets

(58) Field of Classification Search
CPC .. G05D 1/0223; G05D 1/0263; G05D 1/0276; G05D 2201/0206; B60W 60/0011; H04N 23/00; H04N 23/90
See application file for complete search history.

(56) References Cited

U.S. PATENT DOCUMENTS

| | | | |
|---|---|---|---|
| 2019/0187699 A1* | 6/2019 | Salour | G05D 1/024 |
| 2019/0381662 A1 | 12/2019 | Taira et al. | |
| 2020/0050206 A1* | 2/2020 | Deyle | G05D 1/0231 |
| 2020/0072619 A1 | 3/2020 | Fukui | |
| 2021/0397191 A1* | 12/2021 | Nakai | G01C 21/3841 |

FOREIGN PATENT DOCUMENTS

| | | | | |
|---|---|---|---|---|
| JP | 2006-113687 A | 4/2006 | | |
| JP | 2007-293551 A | 11/2007 | | |
| JP | 2017-151687 A | 8/2017 | | |
| WO | 2018/189770 A1 | 10/2018 | | |
| WO | WO-2019123660 A1 * | 6/2019 | | B60W 30/09 |

* cited by examiner

Fig. 3    EXAMPLE OF PROBLEMATIC SITUATIONS AND AVOIDANCE MEASURES

| Case No. | DETECTED MOVING BODY | PROBLEMATIC SITUATION | INSTRUCTION PROVIDED |
|---|---|---|---|
| 1 | ANOTHER AUTONOMOUS MOBILE ROBOT | ENTER DEADLOCK STATE WHEN FACING OR CROSSING IN PASSAGE WHERE ROBOT CANNOT GRASP OTHER DETECTED MOVING OBJECTS | DEADLOCK AVOIDANCE BEHAVIOR BASED ON PRIORITY (STANDBY/DETOUR BEHAVIOR) |
| 2 | CARRYING TROLLEY PRIORITY CARRIER | ENTER DEADLOCK STATE WHEN FACING OR CROSSING ON ROUTE | STANDBY/DETOUR BEHAVIOR |
| 3 | PERSON | ENTER DEADLOCK STATE WHEN FACING OR CROSSING ON ROUTE | · STANDBY/DETOUR BEHAVIOR<br>· APPROACH AREA, NOTIFYING PRESENCE OF ROBOT TO PASS THROUGH |
| 4 | (INSIDE ELEVATOR) ANOTHER AUTONOMOUS MOBILE ROBOT CARRYING TROLLEY PRIORITY CARRIER PERSON | ENTER DEADLOCK STATE WHEN MOVEMENT LINE CROSSES WITH MOVING BODY GETTING OFF ELEVATOR | STAND BY IN ELEVATOR HALL AT POSITION OFF MOVEMENT LINE OF MOVING BODY TO GET OFF ELEVATOR |
| 5 | (INSIDE ELEVATOR) AUTONOMOUS MOBILE ROBOT | UNABLE TO GET OUT OF ELEVATOR DUE TO PERSON IN ELEVATOR HALL ON DESTINATION FLOOR | ISSUE WARNING ABOUT PRESENCE OF ROBOT TO GET OFF NEAR ELEVATOR HALL ON DESTINATION FLOOR |
| 6 | PERSON | RAISE SECURITY RISK OF ENTRY OF PERSON WITH NO PERMISSION INTO ENTRY PROHIBITED AREA | · WHEN DETECTED PERSON IS DETERMINED AS UNAUTHORIZED PERSON, ISSUE WARNING AND PROHIBIT UNLOCKING OF DOOR<br>· MAKE AUTONOMOUS MOBILE ROBOT STAND BY OUTSIDE AREA |

AUTONOMOUS MOBILE ROBOT CONTROL SYSTEM, CONTROL METHOD THEREOF, A NON-TRANSITORY COMPUTER READABLE MEDIUM STORING CONTROL PROGRAM THEREOF, AND AUTONOMOUS MOBILE ROBOT CONTROL DEVICE

CROSS REFERENCE TO RELATED APPLICATIONS

This application is based upon and claims the benefit of priority from Japanese patent application No. 2020-142719, filed on Aug. 26, 2020, the disclosure of which is incorporated herein in its entirety by reference.

BACKGROUND

The present disclosure relates to an autonomous mobile robot control system, its control method, its control program, and an autonomous mobile robot control device.

An autonomous mobile device that autonomously moves in a specified building or facility is under development. Such an autonomous mobile device can serve as a self-driving delivery device that has a carriage or tows a wagon and automatically delivers a package. The self-driving delivery device autonomously moves from the place of departure to the destination and can thereby deliver a package loaded at the place of departure to the destination, for example.

For example, the self-driving delivery device disclosed in U.S. Pat. No. 9,026,301 includes a towing unit and a carriage unit, and a computer included therein stores an electronic map of a floor plan of a building and a path to be followed when moving from one place to another. This self-driving delivery device carries a variety of goods by using different types of carriage units depending on purpose.

SUMMARY

However, a facility in which an autonomous mobile robot is put into operation is an environment where people and the autonomous mobile robot exist together, and the environment is subject to constant change with the movement of people and objects. Further, in the case of putting a plurality of autonomous mobile robots into operation to exist together with people, it is necessary to change a route plan constantly depending on the movement of people. Therefore, merely putting the autonomous mobile robot into operation on the basis of a predetermined path, as in the case of the self-driving delivery device disclosed in U.S. Pat. No. 9,026,301, raises a problem in enhancing the efficiency of the autonomous mobile robot.

The present disclosure has been accomplished to solve the above problem and an object of the present disclosure is thus to reduce the situations where the autonomous mobile robot gets in the way of people's movements.

An autonomous mobile robot control system according to one aspect of the present invention includes an autonomous mobile robot, a host management device configured to manage the autonomous mobile robot on the basis of a route plan defining a moving route of the autonomous mobile robot, and a plurality of environmental cameras configured to capture images of a moving range of the autonomous mobile robot and transmit the captured images to the host management device, wherein the host management device performs moving body detection processing that detects a plurality of moving bodies in the moving range on the basis of image information acquired using the plurality of environmental cameras, moving body path estimation processing that estimates a moving route of each of the plurality of moving bodies on the basis of characteristics of each of the detected moving bodies, avoidance procedure generation processing that sets a plurality of moving bodies whose moving routes overlap among the detected moving bodies as avoidance processing target moving bodies, and generates an avoidance procedure for the avoidance processing target moving bodies so as not to interfere with each other's motion, and robot control processing that gives an instruction to perform avoidance behavior to the avoidance processing target moving bodies on the basis of the generated avoidance procedure.

An autonomous mobile robot control method according to one aspect of the present invention is an autonomous mobile robot control method in an autonomous mobile robot control system including a host management device configured to manage an autonomous mobile robot on the basis of a route plan defining a moving route of the autonomous mobile robot, and a plurality of environmental cameras configured to capture images of a moving range of the autonomous mobile robot and transmit the captured images to the host management device, the method including detecting a plurality of moving bodies in the moving range on the basis of image information acquired using the plurality of environmental cameras by the host management device, estimating a moving route of each of the plurality of moving bodies on the basis of characteristics of each of the detected moving bodies by the host management device, setting a plurality of moving bodies whose moving routes overlap among the detected moving bodies as avoidance processing target moving bodies, and generating an avoidance procedure for the avoidance processing target moving bodies so as not to interfere with each other's motion by the host management device, and giving an instruction to perform avoidance behavior to the avoidance processing target moving bodies on the basis of the generated avoidance procedure by the host management device.

An autonomous mobile robot control program according to one aspect of the present invention is an autonomous mobile robot control program executed in a host management device of an autonomous mobile robot control system including the host management device configured to manage an autonomous mobile robot on the basis of a route plan defining a moving route of the autonomous mobile robot, and a plurality of environmental cameras configured to capture images of a moving range of the autonomous mobile robot and transmit the captured images to the host management device, including detecting a plurality of moving bodies in the moving range on the basis of image information acquired using the plurality of environmental cameras, estimating a moving route of each of the plurality of moving bodies on the basis of characteristics of each of the detected moving bodies, setting a plurality of moving bodies whose moving routes overlap among the detected moving bodies as avoidance processing target moving bodies, and generating an avoidance procedure for the avoidance processing target moving bodies so as not to interfere with each other's motion, and giving an instruction to perform avoidance behavior to the avoidance processing target moving bodies on the basis of the generated avoidance procedure.

An autonomous mobile robot control device according to one aspect of the present invention includes a host management device configured to manage an autonomous mobile robot on the basis of a route plan defining a moving route of the autonomous mobile robot, and a plurality of environmental cameras configured to capture images of a moving range of the autonomous mobile robot and transmit the captured images to the host management device, wherein the host management device includes a moving body detection unit configured to detect a plurality of moving bodies in the moving range on the basis of image information acquired using the plurality of environmental cameras, a moving body path estimation unit configured to estimate a moving route of each of the plurality of moving bodies on the basis of characteristics of each of the detected moving bodies, an avoidance procedure generation unit configured to set a plurality of moving bodies whose moving routes overlap among the detected moving bodies as avoidance processing target moving bodies, and generate an avoidance procedure for the avoidance processing target moving bodies so as not to interfere with each other's motion, and a robot control unit configured to give an instruction to perform avoidance behavior to the avoidance processing target moving bodies on the basis of the generated avoidance procedure.

The autonomous mobile robot control system, its control method, its control program, and the autonomous mobile robot control device according to the present disclosure update a route plan according to an environmental change detected by environmental cameras.

According to the present disclosure, there are provided an autonomous mobile robot control system, its control method, its control program, and an autonomous mobile robot control device that reduce the frequency that an autonomous mobile robot gets in the way of people's movements.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a view illustrating an example of problematic situations which occur when the autonomous mobile robot according to the first embodiment is put into operation, and avoidance measures;

DESCRIPTION OF EMBODIMENTS

Figure 1:
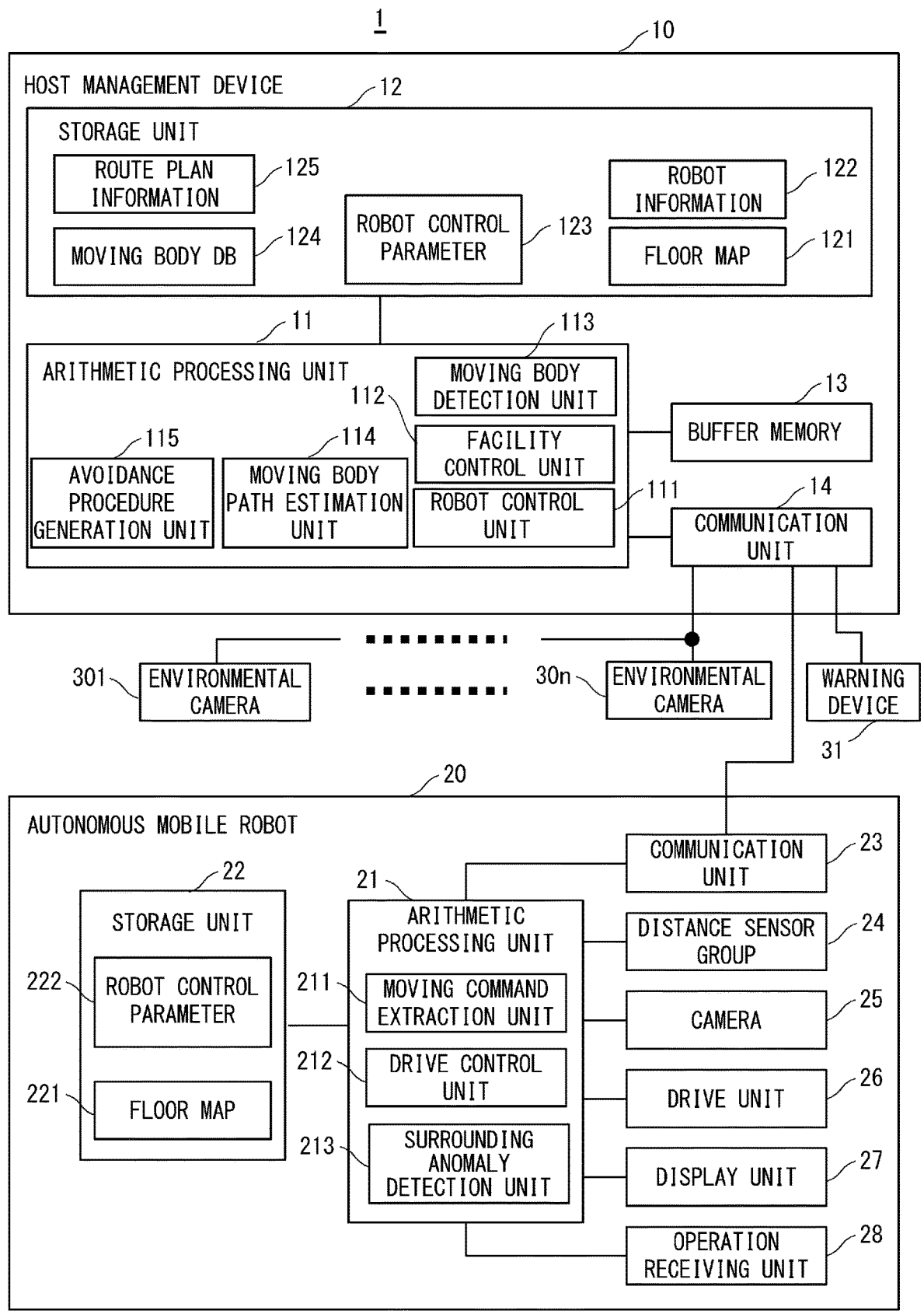
FIG. 1 is a block diagram of an autonomous mobile robot control system according to a first embodiment.

The following description and the attached drawings are appropriately shortened and simplified to clarify the explanation. Further, elements that are shown in the drawings as functional blocks for performing various kinds of processing may be configured by a CPU (Central Processing Unit), a memory or another circuit as hardware or may be implemented by a program loaded to a memory or the like as software. It would be thus obvious to those skilled in the art that those functional blocks may be implemented in various forms such as hardware only, software only or a combination of those, and not limited to either one. In the figures, the identical reference symbols denote identical structural elements and the redundant explanation thereof is omitted.

Further, the above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, although a hospital is used as an example of a facility to which the autonomous mobile robot control system is applied, the autonomous mobile robot control system may be applied to various facilities, not limited to a hospital.

First Embodiment

FIG. 1 is a block diagram of an autonomous mobile robot control system 1 according to a first embodiment. As shown in FIG. 1, the autonomous mobile robot control system 1 according to the first embodiment includes a host management device 10, an autonomous mobile robot (e.g., an autonomous mobile robot 20), environmental cameras 301 to 30n, and a warning device 31. Although only one autonomous mobile robot 20 is shown in FIG. 1, the autonomous mobile robot control system 1 includes a plurality of autonomous mobile robots 20 in this example. This autonomous mobile robot control system 1 allows the autonomous mobile robots 20 to move autonomously in a specified facility and efficiently controls the plurality of autonomous mobile robots 20. To achieve this, the autonomous mobile robot control system 1 places the plurality of environmental cameras 301 to 30n in the facility and thereby acquires images in the range where the autonomous mobile robots 20 move. In the autonomous mobile robot control system 1, the images acquired by the plurality of environmental cameras 301 to 30n are collected by the host management device 10. Further, the autonomous mobile robot control system 1 according to the first embodiment includes the warning device 31 and thereby gives a message notification necessary for the operation of the autonomous mobile robots 20 to users of the facility whose action is not directly controllable by the system.

In the autonomous mobile robot control system 1 according to the first embodiment, the host management device 10 creates a path to the destination of the autonomous mobile robot 20 on the basis of route plan information, and indicates the destination to the autonomous mobile robot 20 according to this route plan. The autonomous mobile robot 20 then autonomously moves toward the destination indicated by the host management device 10. In the autonomous mobile robot control system 1 according to the first embodiment, the autonomous mobile robot 20 autonomously moves toward the destination by using a sensor mounted thereon, a floor map, position information and the like.

Further, in order to prevent the operation of the autonomous mobile robot 20 from getting in the way of the movements of users of the facility, the host management device 10 prevents a decrease in operation efficiency which occurs when a facility user and the autonomous mobile robot 20, the autonomous mobile robot 20 and a carrying trolley, or the autonomous mobile robot 20 and the autonomous mobile robot 20 face or cross each other by using the environmental cameras 301 to 30n. Furthermore, the autonomous mobile robot control system 1 has the function of preventing the entry of an unauthorized person into a security area with access control (e.g., a dispensary, an intensive care unit, or a staff waiting room in the case where the facility is a hospital).

The host management device 10 includes an arithmetic processing unit 11, a storage unit 12, a buffer memory 13, and a communication unit 14. The arithmetic processing unit 11 performs processing for controlling and managing the autonomous mobile robot 20. The arithmetic processing unit 11 may be implemented as a device capable of executing a program such as a central processing unit (CPU) of a computer, for example. Each function may be implemented by a program. Although a robot control unit 111, a facility control unit 112, a moving body detection unit 113, a moving body path estimation unit 114, and an avoidance procedure generation unit 115, which are characteristic in the arithmetic processing unit 11, are shown in FIG. 1, other processing blocks may be included.

The robot control unit 111 performs computation for remotely controlling the autonomous mobile robot 20, and generates a specific motion instruction to be given to the autonomous mobile robot 20. The facility control unit 112 controls the warning device 31 or the open and close of a door, which is not shown, on the basis of avoidance procedure information generated by the avoidance procedure generation unit 115. A plurality of warning devices 31 are installed in the facility. The warning device 31 issues a warning of the passing of the autonomous mobile robot 20, for example, to facility users by sound or text information.

The moving body detection unit 113 detects moving bodies from image information acquired using the environmental cameras 301 to 30n. Moving bodies detected by the moving body detection unit 113 are persons and objects moving in the facility, such as the autonomous mobile robot 20, a carrying trolley for carrying objects, a priority carrier (e.g., stretcher) for which prioritized movement is assured, and a person.

The moving body path estimation unit 114 estimates moving routes of a plurality of moving bodies in the period of time later than the present time on the basis of the characteristics of each of the moving bodies detected by the moving body detection unit 113. To be more specific, the moving body path estimation unit 114 identifies the type of a moving body, such as whether the moving body is a person or the autonomous mobile robot 20, by referring to a moving body database 124 in the storage unit 12. Then, for the autonomous mobile robot 20, the moving body path estimation unit 114 estimates the moving route by referring to the route plan information 125. For the moving body other than the autonomous mobile robot 20, the moving body path estimation unit 114 estimates the moving route according the past action history and the type of the moving body.

The avoidance procedure generation unit 115 sets a plurality of moving bodies whose moving routes overlap among the detected moving bodies as avoidance processing target moving bodies on the basis of the moving routes estimated by the moving body path estimation unit 114. Further, the avoidance procedure generation unit 115 generates an avoidance procedure that does not interfere with each other's motion for the avoidance processing target moving bodies. A specific example of this avoidance procedure and processing performed by the arithmetic processing unit 11 are described in detail later.

The storage unit 12 is a storage unit that stores information necessary for management and control of the robot. In the example of FIG. 1, a floor map 121, robot information 122, a robot control parameter 123, the moving body database 124 and the route plan information 125 are shown; however, information stored in the storage unit 12 may be different from them. The arithmetic processing unit 11 performs computation using the information stored in the storage unit 12 when carrying out processing.

The floor map 121 is map information of the facility in which the autonomous mobile robot 20 moves. This floor map 121 may be created in advance, may be generated from information obtained from the autonomous mobile robot 20, or may be generated by adding map correction information generated from information obtained from the autonomous mobile robot 20 to a basic map created in advance.

The robot information 122 describes the model number, the specification and the like of the autonomous mobile robot 20 managed by the host management device 10. The robot control parameter 123 describes a control parameter such as distance threshold information from an obstacle for each of the autonomous mobile robots 20 managed by the host management device 10. Note that the robot control unit 111 gives a specific motion instruction to the autonomous mobile robot 20 by using the robot information 122, the robot control parameter 123, and the route plan information 125.

The buffer memory 13 is a memory that accumulates intermediate information generated in the processing of the arithmetic processing unit 11. The communication unit 14 is a communication interface for communicating with the plurality of environmental cameras 301 to 30n and at least one autonomous mobile robot 20 that are placed in the facility where the autonomous mobile robot control system 1 is used. The communication unit 14 is capable of performing both of wired communication and wireless communication.

The autonomous mobile robot 20 includes an arithmetic processing unit 21, a storage unit 22, a communication unit 23, a proximity sensor (e.g., distance sensor group 24), a camera 25, a drive unit 26, a display unit 27, and an operation receiving unit 28. Although only typical processing blocks included in the autonomous mobile robot 20 are shown in FIG. 1, many other processing blocks which are not shown may be also included in the autonomous mobile robot 20.

The communication unit 23 is a communication interface for communicating with the communication unit 14 of the host management device 10. The communication unit 23 communicates with the communication unit 14 by using a radio signal, for example. The distance sensor group 24 is a proximity sensor, for example, and outputs nearby object distance information indicating the distance from an object or person existing around the autonomous mobile robot 20. The camera 25 takes an image for grasping the situation around the autonomous mobile robot 20, for example.

Further, the camera 25 may take an image of a positional marker placed on the ceiling or the like of the facility, for example. The autonomous mobile robot control system 1 according to the first embodiment allows the autonomous mobile robot 20 to grasp its own position by using this positional marker. The drive unit 26 drives a drive wheel of the autonomous mobile robot 20. The display unit 27 displays a user interface screen, which functions as the operation receiving unit 28. Further, the display unit 27 may display information indicating the destination of the autonomous mobile robot 20 or the state of the autonomous mobile robot 20. The operation receiving unit 28 includes various types of switches mounted on the autonomous mobile robot 20, in addition to the user interface screen displayed on the display unit 27. The various types of switches include an emergency stop button, for example.

The arithmetic processing unit 21 performs computation used for controlling the autonomous mobile robot 20. To be specific, the arithmetic processing unit 21 includes a moving command extraction unit 211, a drive control unit 212, and a surrounding anomaly detection unit 213. Although only typical processing blocks included in the arithmetic processing unit 21 are shown in FIG. 1, processing blocks which are not shown may be included therein.

The moving command extraction unit 211 extracts a moving command from a control signal supplied from the host management device 10, and supplies it to the drive control unit 212. The drive control unit 212 controls the drive unit 26 so as to move the autonomous mobile robot 20 at the speed and in the direction indicated by the moving command supplied from the moving command extraction unit 211. Further, when the drive control unit 212 receives an emergency stop signal from the emergency stop button included in the operation receiving unit 28, it stops the motion of the autonomous mobile robot 20 and gives an instruction to the drive unit 26 so as not to generate a driving force. The surrounding anomaly detection unit 213 detects an anomaly occurring around the autonomous mobile robot 20 on the basis of information obtained from the distance sensor group 24 or the like, and supplies a stop signal for stopping the autonomous mobile robot 20 to the drive control unit 212. The drive control unit 212 that has received the stop signal gives an instruction to the drive unit 26 so as not to generate a driving force.

The storage unit 22 stores a floor map 221 and a robot control parameter 222. FIG. 1 shows only some of the information stored in the storage unit 22, and information other than the floor map 221 and the robot control parameter 222 shown in FIG. 1 are also stored in the storage unit 22. The floor map 221 is map information of the facility in which the autonomous mobile robot 20 moves. This floor map 221 may be obtained by downloading the floor map 121 of the host management device 10, for example. Note that the floor map 221 may be created in advance. The robot control parameter 222 is a parameter for putting the autonomous mobile robot 20 into motion, and it includes a motion limit threshold for stopping or limiting the motion of the autonomous mobile robot 20 on the basis of the distance from an obstacle or person, for example.

The drive control unit 212 refers to the robot control parameter 222 and stops the motion or limits the moving speed when the distance indicated by distance information obtained from the distance sensor group 24 falls below the motion limit threshold.

Figure 2:
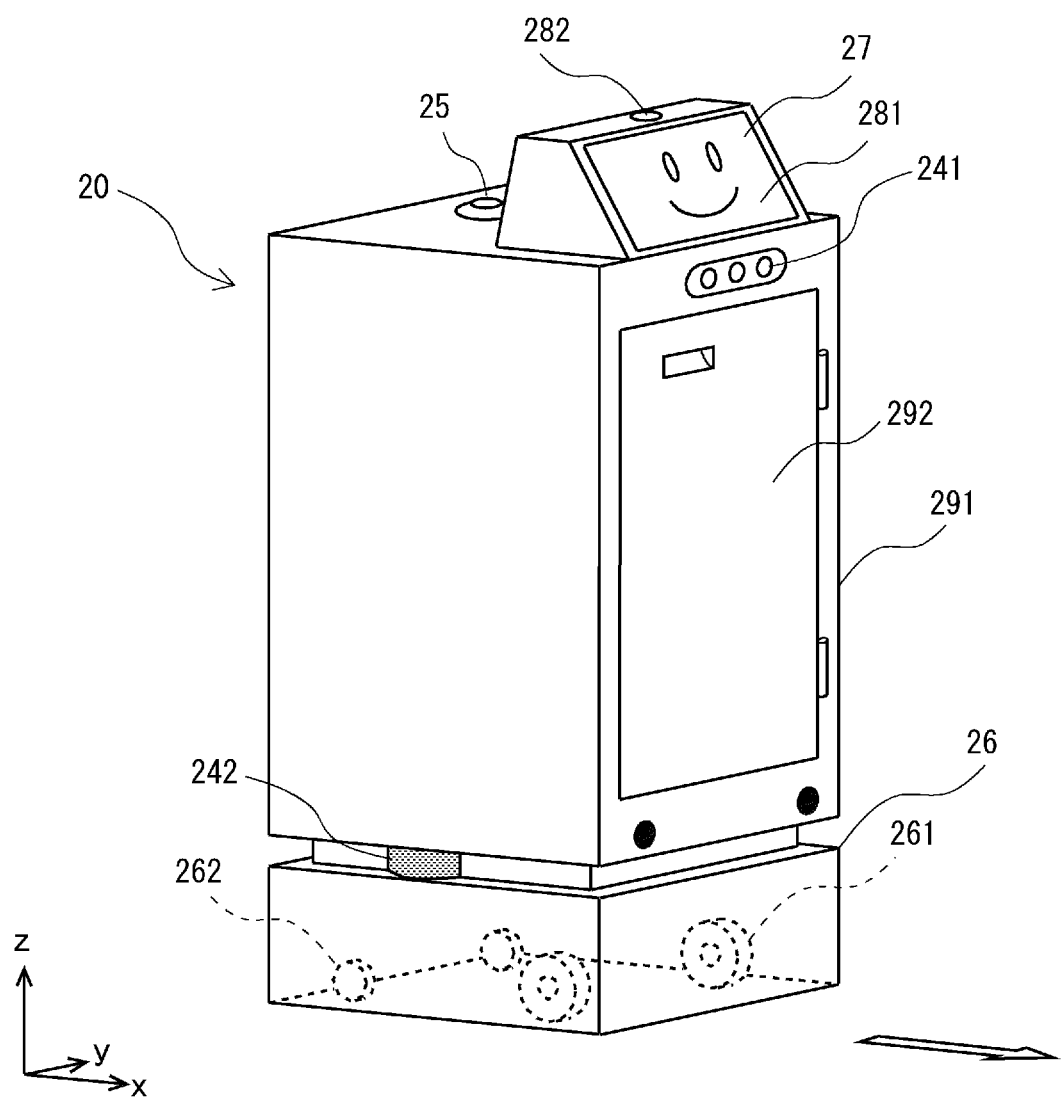
FIG. 2 is a schematic view of an autonomous mobile robot according to the first embodiment.

The exterior of the autonomous mobile robot 20 is described hereinafter. FIG. 2 shows a schematic view of the autonomous mobile robot 20 according to the first embodiment. The autonomous mobile robot 20 shown in FIG. 2 is one form of the autonomous mobile robot 20, and it may be in another form.

The example shown in FIG. 2 is the autonomous mobile robot 20 that includes a storage 291 and a door 292 that seals the storage 291. The autonomous mobile robot 20 carries a stored object stored in the storage 291 to the destination indicated by the host management device 10 by autonomous locomotion. In FIG. 2, the x-direction is the forward direction and the backward direction of the autonomous mobile robot 20, the y-direction is the leftward and rightward direction of the autonomous mobile robot 20, and the z-direction is the height direction of the autonomous mobile robot 20.

As shown in FIG. 2, a front and back distance sensor 241 and a left and right distance sensor 242 are mounted as the distance sensor group 24 on the exterior of the autonomous mobile robot 20 according to the first embodiment. The autonomous mobile robot 20 according to the first embodiment measures the distance from an object or person in the frontward and backward direction of the autonomous mobile robot 20 by using the front and back distance sensor 241. Further, the autonomous mobile robot 20 according to the first embodiment measures the distance from an object or person in the leftward and rightward direction of the autonomous mobile robot 20 by using the left and right distance sensor 242.

In the autonomous mobile robot 20 according to the first embodiment, the drive unit 26 is placed below the storage 291. The drive unit 26 includes a drive wheel 261 and a caster 262. The drive wheel 261 is a wheel for moving the autonomous mobile robot 20 forward, backward, leftward and rightward. The caster 262 is a driven wheel that has no driving force and turns following the drive wheel 261.

Further, in the autonomous mobile robot 20, the display unit 27, an operation interface 281, and the camera 25 are mounted on the top surface of the storage 291. Further, on the display unit 27, the operation interface 281 is displayed as the operation receiving unit 28. Furthermore, an emergency stop button 282 is mounted on the top surface of the display unit 27.

The operation of the autonomous mobile robot control system 1 according to the first embodiment is described hereinafter. The autonomous mobile robot control system 1 according to the first embodiment estimates the motion of moving bodies such as a person and the autonomous mobile robot 20 in the facility where the autonomous mobile robot 20 is in operation, and controls the autonomous mobile robot 20 so as to avoid the situation where the operation of the autonomous mobile robot 20 causes a decrease in efficiency from the estimated route. Further, the autonomous mobile robot control system 1 also has the function of preventing the entry of an unauthorized person into a security area in the facility in addition to improving the operation efficiency of the autonomous mobile robot 20. Situations where a problem occurs in the autonomous mobile robot control system 1 and a method of avoiding those situations are described hereinafter with reference to FIG. 3. FIG. 3 is a view illustrating an example of problematic situations which occur when the autonomous mobile robot according to the first embodiment is put into operation, and avoidance measures.

FIG. 3 shows six examples of the situation where a problem occurs. A first example occurs when the moving routes of the autonomous mobile robots 20 overlap. This first example is the case where the autonomous mobile robots 20 face in one passage or the moving routes of the autonomous mobile robots 20 cross at a turn in a passage or at an intersection. When the situation of the first example occurs, the autonomous mobile robots 20 stop operating at a safe distance from each other by sensors mounted on them, and this stop state is not cleared unless avoidance behavior is given in some way, and therefore a deadlock state where the operation of the autonomous mobile robots 20 stops occurs as long as avoidance behavior is not prepared separately.

In order to prevent such as deadlock from occurring, the autonomous mobile robot control system 1 gives the autonomous mobile robots 20 an instruction to perform deadlock avoidance behavior that puts one autonomous mobile robot 20 into standby mode until the other autonomous mobile robot 20 passes on the basis of the priority assigned to each of the autonomous mobile robots 20.

Note that the priority is set higher as the degree of urgency of a package on the autonomous mobile robot 20 is higher, and it is set higher when the autonomous mobile robot 20 is on the way to the destination. The way of determining the priority is not limited thereto, and it may be set arbitrarily in view of the circumstances of the facility where the autonomous mobile robot control system 1 is applied.

A second example is the case where the moving routes of the autonomous mobile robot 20 and a carrying trolley or a priority carrier face or cross each other on a passage of the facility. The carrying trolley or the priority carrier is pushed by a person or carried by the autonomous mobile robot. Further, the carrying trolley or the priority carrier is left in a passage in the facility in some cases. When the carrying trolley or the priority carrier passes, the autonomous mobile robot 20 may enter emergency stop mode due to button operation by a facility staff or the like, and manual operation is required to clear the emergency stop mode, and therefore the autonomous mobile robot 20 may enter a deadlock state. Further, the carrying trolley or the priority carrier is often considered to have higher priority than the autonomous mobile robot 20, and it is necessary to avoid the situation where the autonomous mobile robot 20 interferes with the passing of them.

Thus, when the situation of the second example occurs, the autonomous mobile robot control system 1 gives the autonomous mobile robots 20 an instruction to perform detour behavior that stands by until the carrying trolley or the priority carrier passes or changes the moving route. The autonomous mobile robot control system 1 thereby prevents a decrease in the operation efficiency of the autonomous mobile robots 20 when the problem of the second example occurs.

A third example is the case where a person and the autonomous mobile robot 20 face or cross each other on the moving route of the autonomous mobile robot 20. The autonomous mobile robot 20 is programmed to stop when a certain distance (e.g., safety distance) cannot be kept from a person by a sensor mounted thereon. Thus, when the autonomous mobile robot 20 passes through an area congested with people, for example, the safety distance cannot be kept and the autonomous mobile robot 20 stops in a crowd, and a deadlock state where the autonomous mobile robot 20 cannot move until the congestion is cleared occurs.

In order to deal with such a deadlock, the autonomous mobile robot control system 1 gives the autonomous mobile robot 20 an instruction to stand by without entering the area of high congestion of people or pass along a route that avoids the area of high congestion. Further, when the degree of congestion of people is low, the autonomous mobile robot control system 1 gives the autonomous mobile robot 20 an instruction to run through the area of low congestion of people, notifying people that the autonomous mobile robot 20 is passing through the area by sound or text information. This notification may be made by using the warning device 31 or using a messaging device (which is not shown in FIG. 2) included in the autonomous mobile robot 20.

A fourth example is the case where any one of another autonomous mobile robot 20, a carrying trolley, a priority carrier, and a person exists inside an elevator to ride on. In such a case, when a path for a person and the like or the autonomous mobile robot 20 to get off the elevator and a path for the autonomous mobile robot 20 waiting in the elevator hall to get on the elevator coincide with each other, the situation where there is no space for waiting inside the elevator or where there is no space for getting out of the elevator occurs. In the event of such a situation, a deadlock state occurs in the autonomous mobile robot 20, and further a user of the elevator cannot get out of the elevator.

To avoid this, in the fourth example, the autonomous mobile robot control system 1 gives the autonomous mobile robot 20 located in the elevator hall an instruction to stand by in a space that is off the moving route (movement line) of a person and the like or the autonomous mobile robot 20 to get off the elevator.

A fifth example is the case where, if there is a person in an elevator hall when the autonomous mobile robot 20 inside an elevator gets off the elevator, the autonomous mobile robot 20 cannot get out of the elevator due to the person in the elevator hall.

In this fifth example, the autonomous mobile robot control system 1 notifies people near the elevator hall that the autonomous mobile robot 20 will get off the elevator through the warning device 31 installed near the elevator hall.

A sixth example is the case where an unauthorized person who is prohibited to enter a security area enters this area by accompanying the autonomous mobile robot 20, which raises a security risk. In this sixth example, when a person accompanying the autonomous mobile robot 20 is detected as a moving body, the autonomous mobile robot control system 1 checks the detected person against security information and then issues a warning through the warning device 31 and prohibits unlocking of the door of the security area. Further, when a security risk occurs in the sixth example, the autonomous mobile robot control system 1 makes the autonomous mobile robot 20 stand by outside the security area.

The above-described problematic situations are only some examples of an event that causes a decrease in the operation efficiency of the autonomous mobile robot 20 in facilities, and the autonomous mobile robot control system 1 according to the first embodiment generates a procedure to avoid a problem corresponding to the conditions of a movable body, such as a detected moving body or a place where the moving body is detected, also for problematic situations other than the above-described example. On the basis of the generated avoidance procedure, the autonomous mobile robot control system 1 gives the autonomous mobile robot 20 an instruction to perform avoidance behavior such as stand-by, detour or warning.

The operation of the autonomous mobile robot control system 1 according to the first embodiment is described hereinafter. Although processing related to generation of an avoidance procedure in the autonomous mobile robot control system 1 according to the first embodiment is particularly described below, the autonomous mobile robot control system 1 according to the first embodiment also performs other necessary processing. Further, the avoidance procedure generated by the autonomous mobile robot control system 1 according to the first embodiment is subject to change depending on the situation where a problem occurs, not limited to the procedure shown in FIG. 3.

Figure 4:
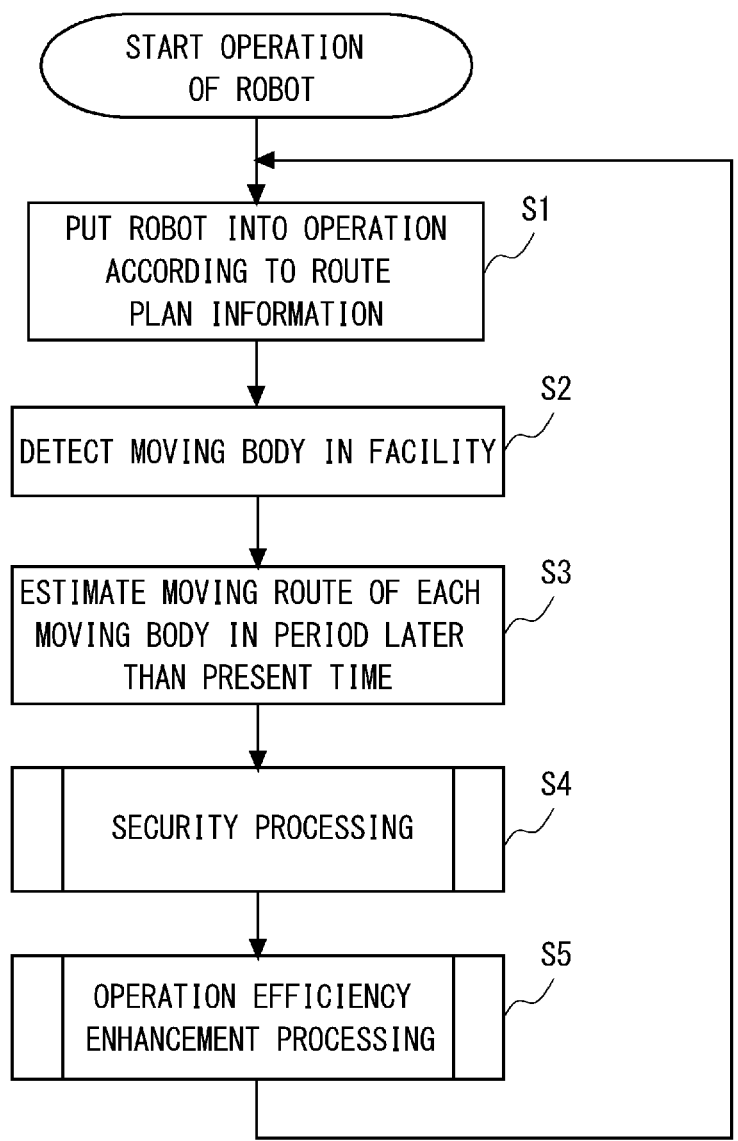
FIG. 4 is a flowchart illustrating the operation of the autonomous mobile robot control system according to the first embodiment.

FIG. 4 is a flowchart illustrating the operation of the autonomous mobile robot control system according to the first embodiment. As shown in FIG. 4, the autonomous mobile robot control system 1 according to the first embodiment puts the autonomous mobile robot 20 into operation according to the route plan information 125 (Step S1). Next, the autonomous mobile robot control system 1 acquires image information in the facility by using the environmental cameras 301 to 30n, and the moving body detection unit 113 detects moving bodies in the facility on the basis of the acquired image information (Step S2). Then, in the autonomous mobile robot control system 1, the moving body path estimation unit 114 estimates moving routes of a plurality of moving bodies on the basis of the characteristics of each of the moving bodies detected by the moving body detection unit 113 (Step S3). After that, the autonomous mobile robot control system 1 performs security processing (Step S4) and operation efficiency enhancement processing (Step S5). Any of the security processing and the operation efficiency enhancement processing may be performed first.

The security processing is processing for preventing the entry of an unauthorized person into a security area, which is described in the sixth example in FIG. 3, for example. The operation efficiency enhancement processing is processing for preventing a decrease in operation efficiency, such as deadlock avoidance, which is described in the first to fifth examples in FIG. 3. Each of the security processing and the operation efficiency enhancement processing is described hereinafter in detail.

Figure 5:
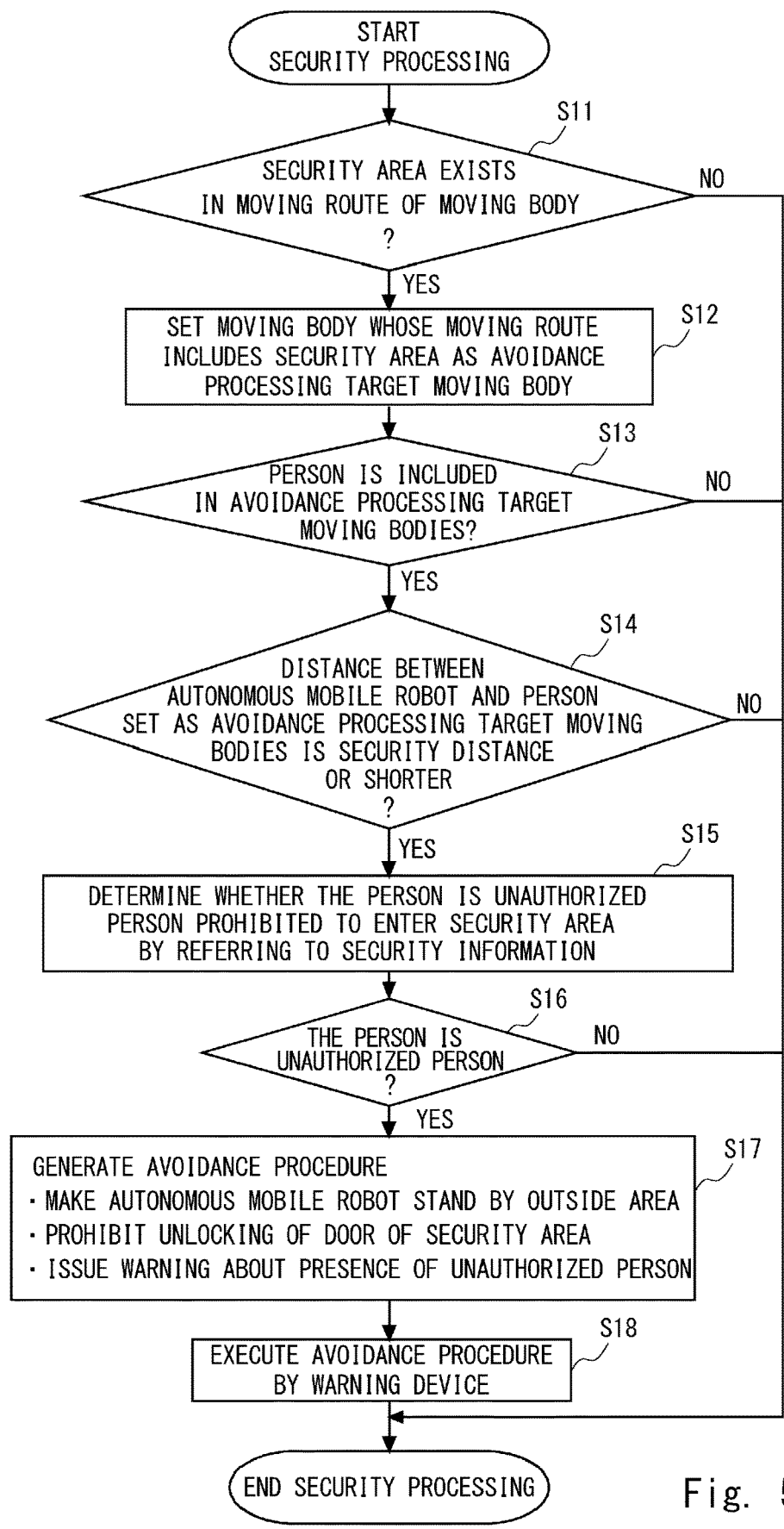
FIG. 5 is a flowchart illustrating the detailed operation of security processing of the autonomous mobile robot control system according to the first embodiment.

FIG. 5 is a flowchart illustrating the detailed operation of security processing of the autonomous mobile robot control system according to the first embodiment. The security processing is performed by mainly using the avoidance procedure generation unit 115, the robot control unit 111, and the facility control unit 112.

In the security processing, the avoidance procedure generation unit 115 performs person determination processing in Steps S11 to S16. In Step S11, it is determined whether there is a security area in a moving route which a moving body is to follow. When a security area is not included in the moving route of any moving body in Step S11, the autonomous mobile robot control system 1 ends the security processing. On the other hand, when it is determined that a security area is included in the moving route of any moving body in Step S11, the avoidance procedure generation unit 115 sets the moving body whose moving route includes a security area as an avoidance processing target moving body (Step S12).

After that, the avoidance procedure generation unit 115 determines whether a person is included in avoidance processing target moving bodies (Step S13). When a person is not included in avoidance processing target moving bodies in Step S13, the autonomous mobile robot control system 1 ends the security processing. On the other hand, when a person is included in avoidance processing target moving bodies in Step S13, it is determined whether the distance between the autonomous mobile robot 20 and the person set as the avoidance processing target moving bodies is equal to or shorter than a security distance that is predetermined as a distance to ensure security (Step S14). When the distance between the autonomous mobile robot 20 and the person is longer than the security distance in Step S14, the autonomous mobile robot control system 1 determines that the safety in the security area is assured and ends the security processing. On the other hand, when the distance between the autonomous mobile robot 20 and the person is equal to or shorter than the security distance in Step S14, the avoidance procedure generation unit 115 determines whether the person near the autonomous mobile robot 20 is allowed to enter the security area or not by referring to security information, which is not shown in FIG. 1 (Step S15, S16).

When the person is determined as an unauthorized person in Step S16, the avoidance procedure generation unit 115 generates measures to prohibit the entry into the security area as the avoidance procedure (Step S17). The avoidance procedure generated in Step S17 includes making the autonomous mobile robot 20 stand by outside the security area, measures to prohibit the unlocking of the door of the security area, and measures to issue a warning about the nearby presence of an unauthorized person through the warning device 31.

After that, in the autonomous mobile robot control system 1, the robot control unit 111 gives a specific movement instruction to the autonomous mobile robot 20, and the facility control unit 112 controls the warning device 31 and the door on the basis of the avoidance procedure generated in Step S17 (Step S18).

Figure 6:
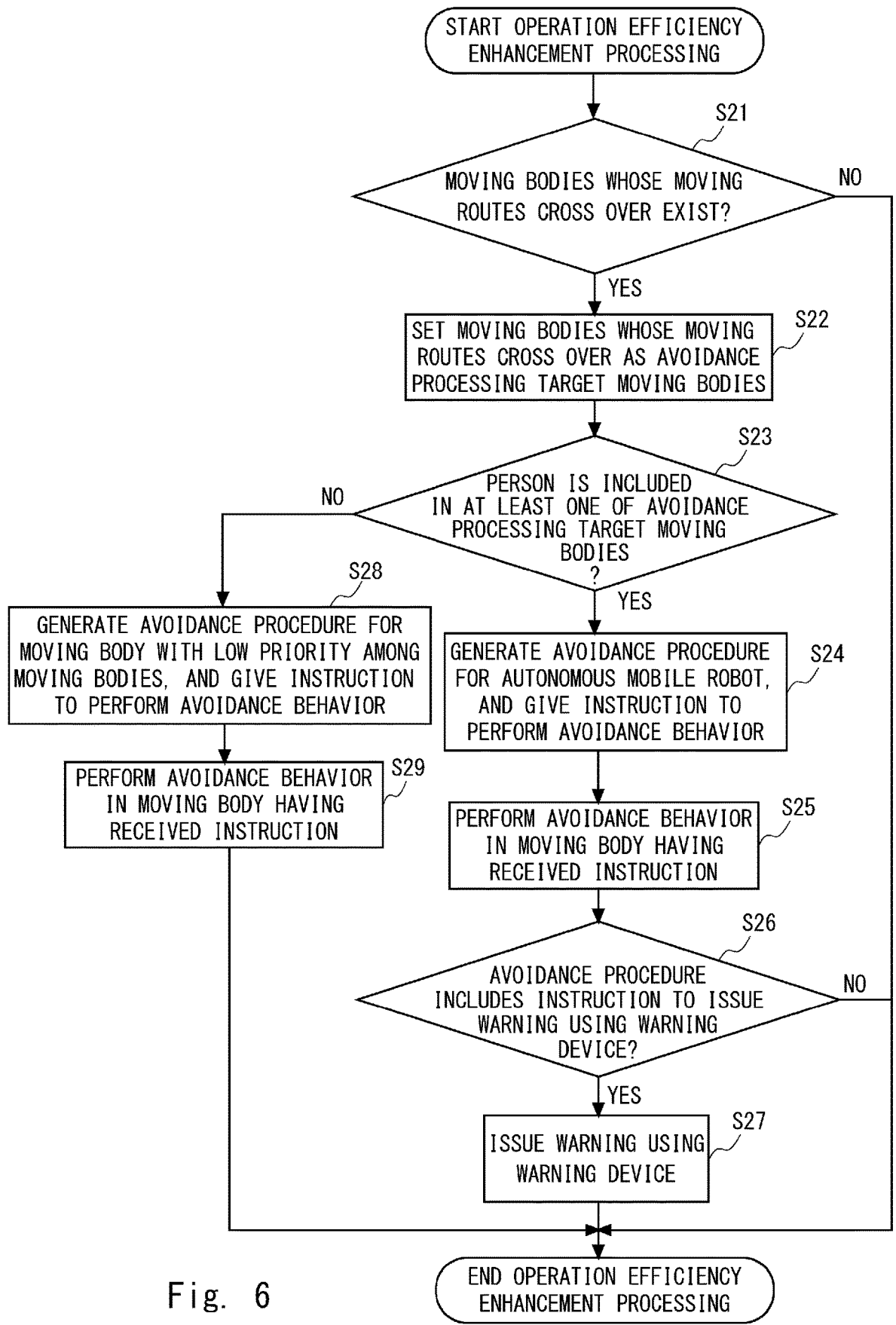
FIG. 6 is a flowchart illustrating the detailed operation of operation efficiency enhancement processing of the autonomous mobile robot control system according to the first embodiment.

The operation efficiency enhancement processing is described hereinafter in detail. FIG. 6 is a flowchart illustrating the detailed operation of operation efficiency enhancement processing of the autonomous mobile robot control system according to the first embodiment. The operation efficiency enhancement processing is performed by mainly using the avoidance procedure generation unit 115, the robot control unit 111, and the facility control unit 112.

As shown in FIG. 6, in the operation efficiency enhancement processing, the avoidance procedure generation unit 115 determines whether there are moving bodies whose moving routes cross over (overlap or cross) (Step S21). When there are no moving bodies whose moving routes cross over in Step S21, the operation efficiency enhancement processing ends. On the other hand, when there are moving bodies whose moving routes cross over in Step S21, the avoidance procedure generation unit 115 sets the moving bodies whose moving routes cross over as avoidance processing target moving bodies (Step S22). After that, the avoidance procedure generation unit 115 determines whether a person is included as at least one of the avoidance processing target moving bodies (Step S23). A person included in the moving bodies may be a person pushing a carrying trolley or a priority carrier.

When a person is included in the avoidance processing target moving bodies in Step S23, the avoidance procedure generation unit 115 generates an avoidance procedure for the autonomous mobile robot 20, and the robot control unit 111 gives the autonomous mobile robot 20 an instruction to perform avoidance behavior according to this avoidance procedure (Step S24). In response to receiving this avoidance behavior instruction, the autonomous mobile robot 20 carries out avoidance behavior (Step S25). Further, when the avoidance procedure generated in Step S24 includes an instruction to issue a warning using the warning device 31 (Yes in Step S26), the facility control unit 112 issues a warning using the warning device 31 according to this avoidance procedure (Step S27). When, on the other hand, the avoidance procedure does not include a warning using the warning device 31 in Step S25, warning processing in Step S27 is not performed, and the process ends.

On the other hand, when a person is not included in the avoidance processing target moving bodies in Step S23, the avoidance procedure generation unit 115 generates an avoidance procedure for a moving body with low priority among the moving bodies included in the avoidance processing target moving bodies, and the robot control unit 111 gives the autonomous mobile robot 20 an instruction to perform avoidance behavior according to this avoidance procedure (Step S28). In response to receiving this avoidance behavior instruction, the autonomous mobile robot 20 carries out avoidance behavior (Step S29).

As described above, the autonomous mobile robot control system 1 according to the first embodiment detects a situation that causes a problem in the operation of the autonomous mobile robot 20 in advance on the basis of image information in a facility which is a moving range of the autonomous mobile robot 20, and generates an avoidance procedure indicating a procedure of avoidance behavior on the basis of the detected result. The autonomous mobile robot control system 1 then controls the autonomous mobile robot 20 or the warning device 31 according to this avoidance procedure, which enhances the operation efficiency of the autonomous mobile robot 20.

Further, the autonomous mobile robot control system 1 according to the first embodiment performs the security processing described in FIG. 5 and thereby prevents the entry of an unauthorized person into a security area and enhances the safety of the security area.

Furthermore, by acquiring images containing reflected light as the image information acquired by the environmental cameras 301 to 30n used in the above-described autonomous mobile robot control system 1, monitoring of trays returned to a carrying trolley, which is used as a soiled dish cart, for example, can be done.

Second Embodiment

In a second embodiment, an autonomous mobile robot control system 2, which is a modified example of the autonomous mobile robot control system 1, is described. In the description of the second embodiment, the same elements as the elements described in the first embodiment are denoted by the same reference symbols as in the first embodiment, and the description thereof is omitted.

Figure 7:
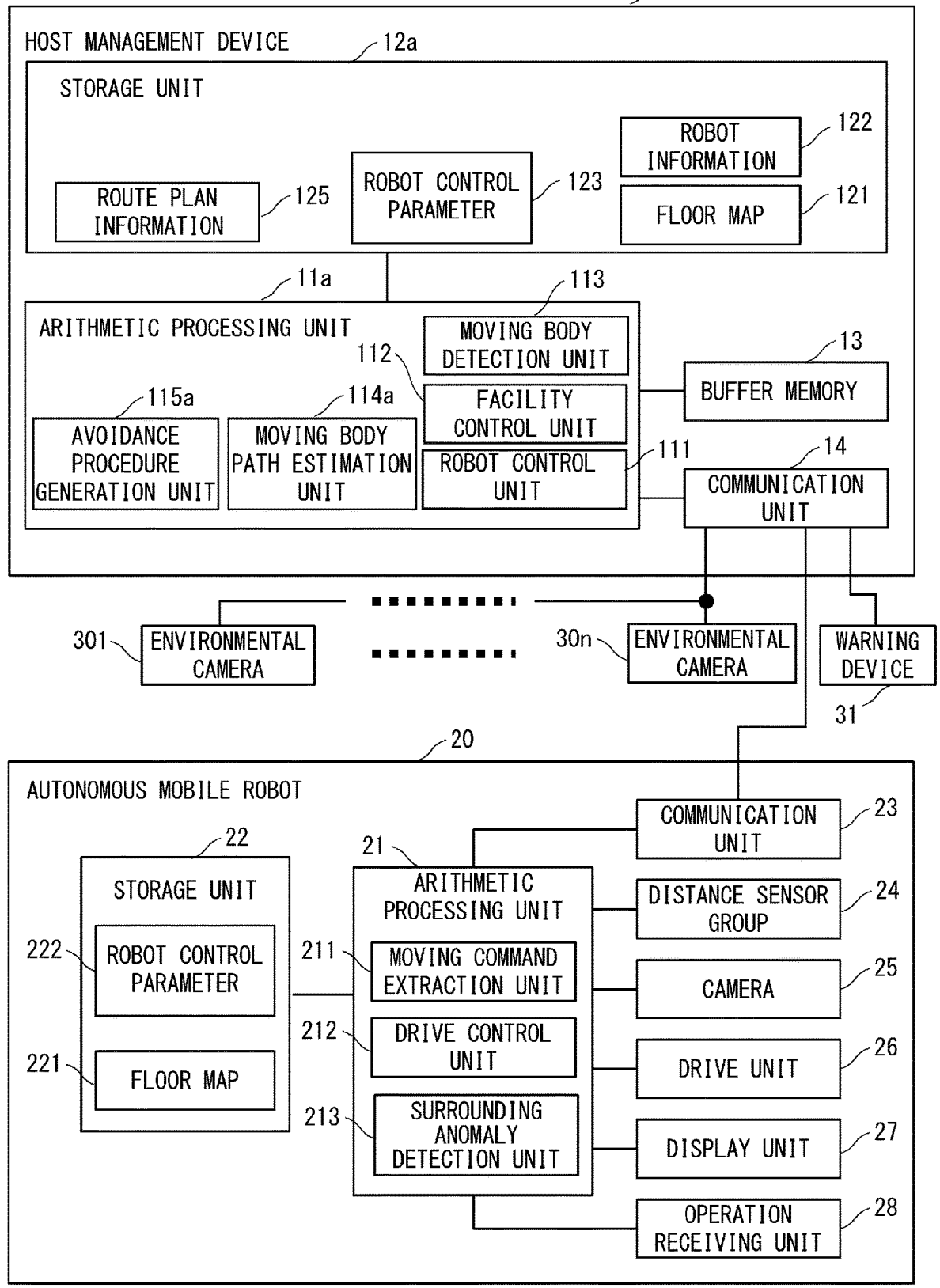
FIG. 7 is a block diagram of an autonomous mobile robot control system according to a second embodiment.

FIG. 7 is a block diagram of the autonomous mobile robot control system 2 according to the second embodiment. As shown in FIG. 7, in the autonomous mobile robot control system 2 according to the second embodiment, the host management device 10 in the autonomous mobile robot control system 1 is replaced with a host management device 10a. Further, in the host management device 10a, the arithmetic processing unit 11 is replaced with an arithmetic processing unit 11a, and the storage unit 12 is replaced with a storage unit 12a.

In the arithmetic processing unit 11a, the moving body path estimation unit 114 and the avoidance procedure generation unit 115 in the host management device 10 are replaced with a moving body path estimation unit 114a and an avoidance procedure generation unit 115a. In the storage unit 12a, the moving body database 124 in the storage unit 12 is eliminated.

The moving body path estimation unit 114a and the avoidance procedure generation unit 115a are a predictor using artificial intelligence to which information about movable bodies detected by the moving body detection unit 113 is input, for example. Then, the moving body path estimation unit 114a and the avoidance procedure generation unit 115a implement the same functions as the moving body path estimation unit 114 and the avoidance procedure generation unit 115, respectively, by using the functions of the predictor.

As described above, with the predictor using artificial intelligence, the autonomous mobile robot control system 2 according to the second embodiment is capable of predicting the movement pattern of a moving body more flexibly than the case of using static information stored in the moving body database 124. Further, with use of the moving body path estimation unit 114a and the avoidance procedure generation unit 115a, the autonomous mobile robot control system 2 according to the second embodiment is capable of predicting the movement pattern of a moving body more accurately than the autonomous mobile robot control system 1 according to the first embodiment. Therefore, the autonomous mobile robot control system 2 according to the second embodiment reduces the frequency that the autonomous mobile robot 20 interferes with the flow of people more significantly than the autonomous mobile robot control system 1 according to the first embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

For example, the arithmetic processing unit 11 and the storage unit 12 included in the host management device 10 may be located in a remote place which is distant from the facility where management areas are set through a network.

What is claimed is:

1. An autonomous mobile robot control system comprising:
    an autonomous mobile robot;
    a processor configured to manage the autonomous mobile robot on the basis of a route plan defining a moving route of the autonomous mobile robot; and
    a plurality of environmental cameras configured to capture images of a moving range of the autonomous mobile robot and transmit the captured images to the processor, wherein
    the processor is configured to perform:
        moving body detection processing that detects a plurality of moving bodies in the moving range on the basis of image information acquired using the plurality of environmental cameras,
        moving body path estimation processing that estimates a moving route of each of the plurality of moving bodies on the basis of characteristics of each of the detected moving bodies,
        avoidance procedure generation processing that sets a subset of the plurality of moving bodies whose moving routes overlap among the detected moving bodies as avoidance processing target moving bodies, and generates an avoidance procedure for the avoidance processing target moving bodies so as not to interfere with each other's motion, and
        robot control processing that gives an instruction to perform avoidance behavior to the avoidance processing target moving bodies on the basis of the generated avoidance procedure, and wherein
    the moving body path estimation processing further includes:
        identifying the moving route of the autonomous mobile robot in a period later than the present time on the basis of route plan information indicating the route plan for the autonomous mobile robot, and estimating a moving route of a first moving body of the plurality of moving bodies different from the autonomous mobile robot among the detected moving bodies on the basis of characteristics of the first moving body and an action history of the first moving body in a period earlier than the present time.

2. The autonomous mobile robot control system according to claim 1, wherein the moving body detection processing detects, as the plurality of moving bodies, objects being movable, including at least one of a person, the autonomous mobile robot, and a carrying trolley from the image information.

3. The autonomous mobile robot control system according to claim 1, wherein the avoidance procedure generation processing performs moving body determination processing that determines whether at least one of the avoidance processing target moving bodies is a person or an object including a person, and when at least one of the avoidance processing target moving bodies is the person or the object including a person, and another one of the avoidance processing target moving bodies is the autonomous mobile robot, the avoidance procedure generation processing generates the avoidance procedure for the autonomous mobile robot set as the avoidance processing target moving body so as not to interfere with motion of the avoidance processing target moving body whose moving route overlaps the moving route of the autonomous mobile robot.

4. The autonomous mobile robot control system according to claim 1, wherein the avoidance procedure generation processing performs moving body determination processing that determines whether at least one of the avoidance processing target moving bodies is a person or an object including a person, when at least one of the avoidance processing target moving bodies is not the person or the object including a person, the avoidance procedure generation processing further performs priority identifying processing that identifies priorities of moving bodies included in the avoidance processing target moving bodies, and the avoidance procedure generation processing generates the avoidance procedure for the autonomous mobile robot corresponding to the moving body with low priority so as not to interfere with motion of the other avoidance processing target moving bodies.

5. The autonomous mobile robot control system according to claim 1, wherein the avoidance procedure generation processing further includes giving an instruction to issue a warning to a notification device installed in the moving range, and the processor performs facility control processing that gives the instruction to issue the warning to the notification device on the basis of the avoidance procedure.

6. The autonomous mobile robot control system according to claim 1, wherein when there is a security area where access is limited to a specific person in the moving route which the autonomous mobile robot is to follow, the avoidance procedure generation processing performs person determination processing that determines whether the first moving body of the plurality of moving bodies is a person allowed to enter the security area, when a person is an unauthorized person determined not to be allowed to enter the security area exists at a specified distance from the autonomous mobile robot, the avoidance procedure generation processing generates measures to prohibit entry into the security area as the avoidance procedure, and the processor performs facility control processing that gives an instruction to take measures to ensure security of the security area on the basis of the avoidance procedure.

7. An autonomous mobile robot control method in an autonomous mobile robot control system including a processor configured to manage an autonomous mobile robot on the basis of a route plan defining a moving route of the autonomous mobile robot, and a plurality of environmental cameras configured to capture images of a moving range of the autonomous mobile robot and transmit the captured images to the processor, comprising:

detecting, by the processor, a plurality of moving bodies in the moving range on the basis of image information acquired using the plurality of environmental cameras;

estimating, by the processor, a moving route of each of the plurality of moving bodies on the basis of characteristics of each of the detected moving bodies;

setting, by the processor, a subset of the plurality of moving bodies whose moving routes overlap as avoidance processing target moving bodies, and generating an avoidance procedure for the avoidance processing target moving bodies so as not to interfere with each other's; and giving, by the processor, an instruction to perform avoidance behavior to the avoidance processing target moving bodies on the basis of the generated avoidance procedure, wherein the estimating, by the processor, of the moving route of each of the plurality of moving bodies further includes:
identifying, by processor, the moving route of the autonomous mobile robot in a period later than the present time on the basis of route plan information indicating the route plan for the autonomous mobile robot, and estimating, by processor, a moving route of a first moving body of the plurality of moving bodies different from the autonomous mobile robot among the detected moving bodies on the basis of characteristics of the first moving body and an action history of the first moving body in a period earlier than the present time.

8. A non-transitory computer readable medium storing an autonomous mobile robot control program executed in a processor of an autonomous mobile robot control system including the processor configured to manage an autonomous mobile robot on the basis of a route plan defining a moving route of the autonomous mobile robot, and a plurality of environmental cameras configured to capture images of a moving range of the autonomous mobile robot and transmit the captured images to the processor, the autonomous mobile robot control program causing the processor to execute:

detecting a plurality of moving bodies in the moving range on the basis of image information acquired using the plurality of environmental cameras;

estimating a moving route of each of the plurality of moving bodies on the basis of characteristics of each of the detected moving bodies;

setting a subset of the plurality of moving bodies whose moving routes overlap among the detected moving bodies as avoidance processing target moving bodies, and generating an avoidance procedure for the avoidance processing target moving bodies so as not to interfere with each other's motion; and giving an instruction to perform avoidance behavior to the avoidance processing target moving bodies on the basis of the generated avoidance procedure, and wherein the estimating of the moving route of each of the plurality of the moving bodies further includes:

identifying the moving route of the autonomous mobile robot in a period later than the present time on the basis of route plan information indicating the route plan for the autonomous mobile robot, and estimating a moving route of a first moving body of the plurality of moving bodies different from the autonomous mobile robot among the detected moving bodies on the basis of characteristics of the first moving body and an action history of the first moving body in a period earlier than the present time.

9. An autonomous mobile robot control device comprising:

a processor configured to manage an autonomous mobile robot on the basis of a route plan defining a moving route of the autonomous mobile robot; and a plurality of environmental cameras configured to capture images of a moving range of the autonomous mobile robot and transmit the captured images to the processor, wherein the processor is configured to:

detect a plurality of moving bodies in the moving range on the basis of image information acquired using the plurality of environmental cameras, estimate a moving route of each of the plurality of moving bodies on the basis of characteristics of each of the detected moving bodies, set a subset of the plurality of moving bodies whose moving routes overlap among the detected moving bodies as avoidance processing target moving bodies, and generate an avoidance procedure for the avoidance processing target moving bodies so as not to interfere with each other's motion, and give an instruction to perform avoidance behavior to the avoidance processing target moving bodies on the basis of the generated avoidance procedure, and wherein the processor estimates the moving route of each of the plurality of the moving bodies by:

identifying the moving route of the autonomous mobile robot in a period later than the present time on the basis of route plan information indicating the route plan for the autonomous mobile robot, and estimating a moving route of a first moving body of the plurality of moving bodies different from the autonomous mobile robot among the detected moving bodies on the basis of characteristics of the first moving body and an action history of the first moving body in a period earlier than the present time.

* * * * *